Sept. 11, 1934.　　　　C. H. MILLER　　　　1,973,576

VARIABLE SPEED TRANSMISSION

Filed April 4, 1934

Inventor
Charles H. Miller
by Rummler, Rummler & Woodworth
his attys.

Patented Sept. 11, 1934

1,973,576

UNITED STATES PATENT OFFICE 1,973,576

VARIABLE SPEED TRANSMISSION

Charles Henry Miller, Chicago, Ill., assignor to E. H. Sargent & Co., Chicago, Ill., a corporation of Illinois Application April 4, 1934, Serial No. 718,917

7 Claims. (Cl. 74—191)

This invention relates to motor-driven mixers and particularly variable speed mixers suitable for laboratory use.

The main objects of this invention are to provide an improved electric motor-driven mixer having a simple, quickly adjustable arrangement for varying the speed of rotation of the mixing shaft; to provide such a device having a compact arrangement of few elements; and to provide such a device having a simple frictional drive including an improved arrangement for maintaining contact between the driving and driven rotating elements.

A specific embodiment of this invention is shown in the accompanying drawing, in which.

Figure 2:
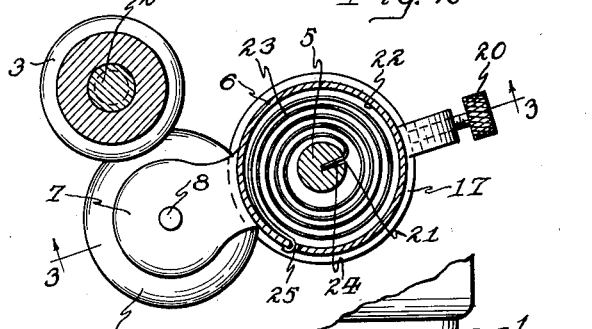
Fig. 2 is a sectional view taken on line 2—2 of Fig. 1 and showing an arrangement for urging the driving and driven elements into engagement with each other.

In the form shown in the drawing, my improved mixer comprises a vertically suspended electric motor 1 having a downwardly projecting driving shaft 2 on which is mounted a cone-shaped friction member 3, the surface of said cone member being tapered downwardly toward the axis of said member and terminating in a cylindrical tip 4.

Projecting outwardly from the casing of the motor 1 and fixedly mounted thereon is a supporting rod, or arbor 5, which is disposed at one side of the shaft 2 and extends parallel therewith. The arbor 5 is threaded for substantially its entire length and a hub 6 is pivotally mounted thereon, the hub 6 having a pair of parallel arms 7 which extend laterally therefrom.

Suitably journaled in the arms 7 is a driven shaft 8 which extends outwardly from the arms 7 in a direction parallel to the supporting rod or arbor 5 and the motor shaft 2.

Mounted on the shaft 8 and between the arms 7 is a collar 9 which is keyed to the shaft 8 by a suitable means such as the set screw 10 and above the collar 9 is a wheel-shaped friction member 11 having a peripheral frictional surface preferably in the form of a rubber tire 12. The wheel member 11 is keyed to the collar 9 by means of lugs or pins 13 on the collar 9 which extend into suitable openings in the member 11.

Axial thrust on the shaft 8 is supported by means of a ball bearing 14 disposed between the collar 9 and the outermost arm 7 and the shaft 8 is provided at its end with a chuck 15 arranged to hold and retain a mixing rod 16.

Figure 3:
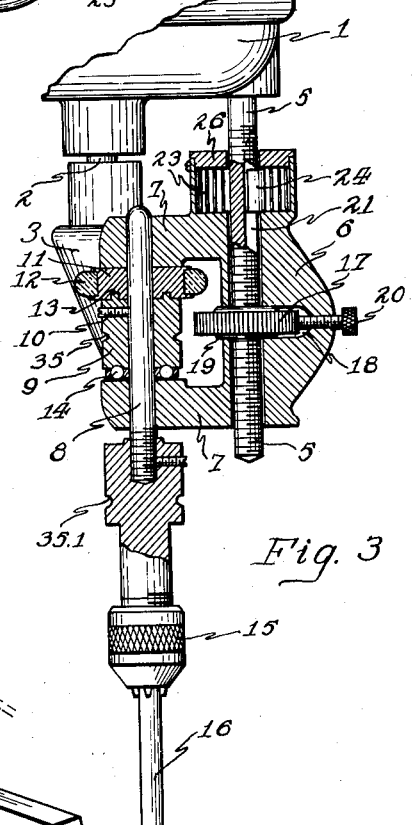
Fig. 3 is a partially sectioned view taken on line 3—3 of Fig. 2 and showing an arrangement for varying the speed of rotation of the driven shaft.

The hub 6 is supported on the rod or arbor 5 by means of a nut 17 disposed in a lateral slot 18 which extends across the axis of the hub 6 and between the arms 7. The nut 17 is preferably circular in form and provided with a knurled periphery and each face is provided with a shoulder 19 which bears against the adjacent side of the slot 18. A headed set screw 20, extending through a side of the hub 6 is provided to serve as a locking means to prevent inadvertent rotation of the nut 17. As shown in Fig. 3, the supporting rod or arbor 5 is provided with a milled groove or slot 21 which extends longitudinally of the arbor 5 for substantially its entire length and the hub 6 at one end is provided with a hollow chamber 22 through which the rod or arbor 5 passes or extends.

Disposed within the chamber 22 is a spring 23, preferably of the spiral coiled clock-spring type, which is splined to the arbor 5. In the arrangement shown the inner end 24 of the spring is bent inwardly toward the spring axis and seated in the slot or groove 21 and the outer end of the spring is secured to the hub 6 in any suitable manner, such as hooking the said outer end of the spring in a slot 25 in the side wall of the hub 6, the spring being tensioned to normally urge the hub and its arms pivotally on the arbor 5. The upper end of the chamber 22 is open to permit assembling the spring 23 therein and a cap 26 is provided to close off that opening.

The motor of my improved mixing device is preferably provided with a bracket 27 mounted on the motor end bell opposite the cone pulley 3.

The device is then supported on a vertical standard 28 having a shiftable lateral arm 29 which extends through an opening in the bracket 27. The arm 29 is secured to the standard 28 by means of a locking screw 30 and the bracket 27 is secured to the lateral arm 29 by means of the locking screw 31. The bracket 27 is also provided with a handle 32 by means of which the mixing device may be held while the arm 29 is being shifted vertically on the standard 28 or the bracket 27 is being shifted laterally on the arm 29.

Figure 1:
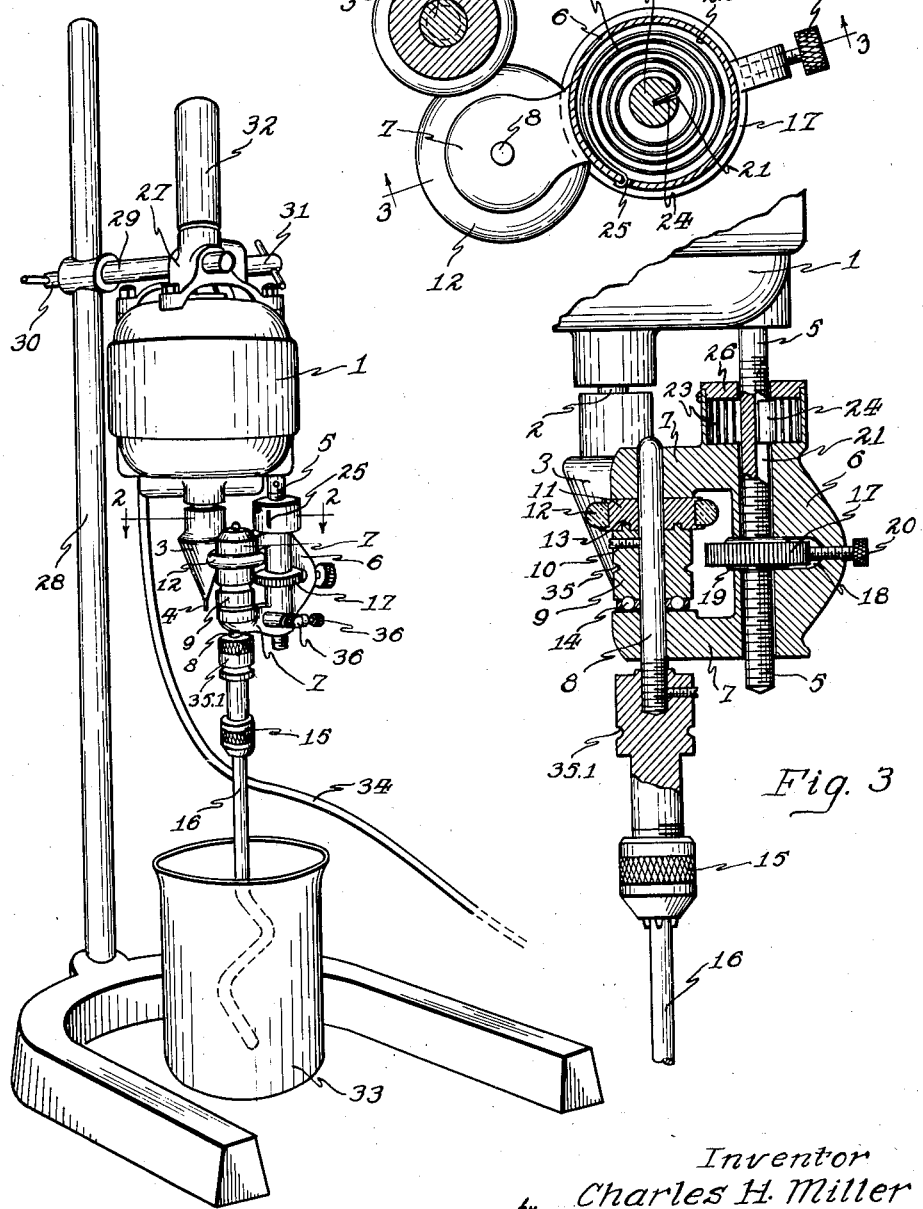
Figure 1 is a perspective view of a complete mixing device.

In operation my improved mixing device is mounted substantially as shown in Figure 1, its vertical height and lateral position being adjusted according to the nature of the receptacle 33 and the amount of substance held therein to be mixed.

Current is supplied to the electric motor 1 by means of the conductor cord 34 and power is transmitted from the motor drive shaft 2 to the driven shaft 8 through frictional contact of the tire 12 on wheel member 11 with the cone member 3, the tire 12 being constantly urged into contact with the cone member 3 by the spring 23.

The spring 23 is tensioned to urge the hub 6 pivotally on the arbor 5 and thereby urge the arms 7, which carry the shaft 8, toward the cone member 3.

By varying the axial position of the line of contact between the tire 12 and the periphery of the cone member 3, the speed of rotation of the driven shaft 8 may be adjusted over a wide range.

At the base, or widest portion of the cone member 3, the speed of the driven shaft 8 is the greatest; while at the cylindrical tip 4 of the cone member the speed of rotation of the shaft 8 is the slowest.

The adjustment for variation of speed in the driven shaft 8 is made by first loosening the locking screw 20 and then turning the nut 17 so as to shift the hub 6 axially on the supporting rod or arbor 5. As the nut 17 is turned to shift the hub 6 on the rod 5, the position of the tire 12 and wheel 11 is shifted axially relative to the cone member 3, and the tire 12 engages a greater or lesser circumference of the cone member accordingly as its position is shifted up or down.

Frictional contact between the cone and wheel members is maintained substantially the same for all adjustments of the arm 7 along the axis of the arbor 5 by means of the arrangement whereby the spring 23 is carried with the hub 6. As the hub is shifted the end 24 of the spring, which is seated in the groove 22, moves an equal amount along the groove 22 and thereby obviates axial distortion of the spring and maintains a substantially uniform spring tension.

Through the threaded engagement of the nut 17 with the arbor or rod 5, any desired amount of axial shifting of the hub 6 may be had. Thus a wide range of speeds that might be transmitted to the shaft 8 is obtainable. Such adjustment is had without any disconnecting of gears and the adjustment may even be made without stopping the motor 1.

In the form shown in the drawing, the collar 9 is provided with an annular peripheral groove 35 which might, if desired, be utilized to drive other rotative devices through the medium of a belt not shown; and a second such groove 35.1 is provided adjacent the chuck 15 for a similar purpose.

The binding posts 36, shown in Figure 1, are for the purpose of supporting electrodes, not shown, that may be arranged to hang down into the receptacle 33 and the substance therein that is being mixed.

The principal advantages of my improved mixing device reside in the simplicity of the structure by which a variation of the speed of rotation of the driven shaft is had; and also in the arrangement whereby the speed of the driven shaft may be quickly adjusted with a minimum of effort and without the necessity of stopping and then starting the driving motor, this feature being of considerable importance in laboratory work where, in certain processes, any loss of time would be a serious handicap.

Although but one specific embodiment of this invention is herein shown and described, it is to be understood that numerous details of the construction shown may be altered or omitted without departing from the spirit of this invention as defined by the following claims.

I claim:

1. The combination of a drive shaft, a driven shaft, an arbor parallel with said driven shaft, an arm mounted on said arbor and arranged to carry said driven shaft, said arm being swingable on the axis of said arbor to move said driven shaft toward said drive shaft, a cone-shaped friction member on one of said shafts, a wheel-shaped friction member on the other of said shafts, said friction members being positioned for engagement with each other, a spring splined to said arbor and arranged to urge said arm toward said drive shaft, and means to shift said arm along the axis of said arbor.

2. The combination of a drive shaft, a driven shaft, an arbor parallel with said driven shaft and having a longitudinally extending slot, an arm mounted on said arbor and arranged to carry said driven shaft, said arm being swingable on the axis of said arbor to move said driven shaft toward said drive shaft, a cone-shaped friction member on one of said shafts, a wheel-shaped friction member on the other of said shafts, said friction members being positioned for engagement with each other, a spiral spring having its inner end seated in said slot and arranged to urge said arm toward said drive shaft, and means to shift said arm along the axis of said arbor, the inner end of said spring shifting along said slot when said arm is shifted.

3. The combination of a drive shaft, a driven shaft, an arbor parallel with said driven shaft, an arm pivotally mounted on said arbor and arranged to carry said driven shaft, said arm being swingable toward said drive shaft, a cone-shaped friction member on one of said shafts, a wheel-shaped friction member on the other of said shafts, said friction members being positioned to engage each other, means normally urging said arm toward said drive shaft, and a nut associated with said arm and having threaded engagement with said arbor, said nut being arranged to be rotatable independent of said arm and engaged therewith to shift said arm axially on said arbor.

4. The combination of a drive shaft, a driven shaft, an arbor parallel with said driven shaft and having an axially extending slot, an arm arranged to carry said driven shaft and having a hub pivotally mounted on said arbor, said arm being swingable toward said drive shaft, a cone-shaped friction member on one of said shafts, a wheel-shaped friction member on the other of said shafts, said friction members being positioned to engage each other, a spring housed in said hub and having one end seated in said slot and the other end secured to said hub, said spring being arranged to urge said arm toward said drive shaft, and means to shift said hub axially on said arbor.

5. A mixing device of the class described, comprising a motor having a projecting shaft and a cone member fixed on said shaft, a supporting rod mounted on said motor and extending parallel with the motor shaft, an arm having a hub shiftably mounted on said supporting rod, said arm extending laterally from said rod, a driven shaft journaled in said arm and carrying a wheel positioned to frictionally engage said cone member, a nut having threaded engagement with said rod and associated with said hub to shift the same axially on said rod, said nut being arranged to be rotatable independent of said hub, and means normally urging said arm toward said cone member to engage said wheel therewith.

6. A mixing device of the class described, comprising a motor having a projecting shaft carrying a friction member fixed thereon, an arbor mounted on said motor and extending parallel with the motor shaft, said arbor having a longitudinally extending groove, an arm mounted on said arbor and extending laterally therefrom, a driven shaft journaled in said arm, a friction member fixed on said driven shaft and positioned to engage the first-named friction member whereby said driven shaft is rotated, one of said friction members being cone-shaped and the other wheel-shaped, a spiral spring having its inner end seated in the groove in said arbor and arranged to urge said arm pivotally on the axis of said arbor and toward the motor shaft, and means arranged to shift said arm along the axis of said arbor to vary the axial location of the line on which said wheel-shaped friction member contacts the periphery of said cone-shaped friction member.

7. A mixing device of the class described, comprising a motor having a projecting drive shaft, a rod extending parallel with the drive shaft and having a longitudinal groove in its peripheral surface, an arm having a hub pivotally mounted on said rod, said hub having a hollow chamber through which said rod extends, a driven shaft journaled in said arm, a cone-shaped friction member on one of said shafts, a wheel-shaped friction member on the other of said shafts, said friction members being positioned to engage each other whereby said driven shaft is rotated, a spring disposed within said chamber, one end of said spring being seated in the groove in said rod and the other end being secured to said hub, said spring being tensioned to pivotally urge said arm toward said cone pulley, and means arranged to shift said hub along the axis of said rod to axially shift the relative positions of said friction members and thereby vary the ratio of the periphery of said wheel member and the periphery of said cone member at the line of contact of said wheel and said cone member.

CHARLES HENRY MILLER.